(12) United States Patent
Dharmarajan et al.

(10) Patent No.: US 7,943,701 B2
(45) Date of Patent: May 17, 2011

(54) FIBERS AND NON-WOVENS PREPARED WITH PROPYLENE-BASED ELASTOMERS

(75) Inventors: Narayanaswami Raja Dharmarajan, Houston, TX (US); Smita Kacker, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 507 days.

(21) Appl. No.: 11/698,359

(22) Filed: Jan. 26, 2007

(65) Prior Publication Data

US 2008/0182940 A1    Jul. 31, 2008

(51) Int. Cl.
  *C08L 23/04* (2006.01)
  *D04H 1/00* (2006.01)
(52) U.S. Cl. ........................ 525/240; 442/327
(58) Field of Classification Search .................. 525/240; 442/327
  See application file for complete search history.

(56) References Cited

U.S. PATENT DOCUMENTS

| | | | | |
|---|---|---|---|---|
| 6,080,818 | A * | 6/2000 | Thakker et al. | 525/240 |
| 6,342,565 | B1 | 1/2002 | Cheng et al. | 525/191 |
| 6,897,272 | B1 * | 5/2005 | Brookhart et al. | 526/93 |
| 6,984,696 | B2 * | 1/2006 | Curry et al. | 525/191 |
| 7,081,299 | B2 | 7/2006 | Richeson | 428/394 |
| 2004/0186214 | A1 * | 9/2004 | Li et al. | 524/474 |
| 2004/0192823 | A1 | 9/2004 | Curry et al. | 524/474 |
| 2005/0106978 | A1 * | 5/2005 | Cheng et al. | 442/327 |
| 2005/0107529 | A1 * | 5/2005 | Datta et al. | 525/70 |
| 2005/0130544 | A1 * | 6/2005 | Cheng et al. | 442/415 |
| 2005/0244619 | A1 * | 11/2005 | Kauschke et al. | 428/195.1 |
| 2006/0036042 | A1 | 2/2006 | Curry et al. | 525/240 |
| 2006/0172647 | A1 | 8/2006 | Mehta et al. | 442/327 |
| 2007/0015877 | A1 | 1/2007 | Burkhardt et al. | 525/240 |

FOREIGN PATENT DOCUMENTS

| | | |
|---|---|---|
| EP | 1 336 641 | 8/2003 |
| WO | 2004/087806 | 10/2004 |
| WO | WO2006113132 | 10/2006 |

OTHER PUBLICATIONS

Lowery, R. D., "Hydrocarbon Resins", 2000, Kirk-Othmer Encyclopedia of Chemical Technology, John Wiley & Sons, Inc., p. 17.*

* cited by examiner

*Primary Examiner* — Mark Eashoo
*Assistant Examiner* — David Karst
(74) *Attorney, Agent, or Firm* — Kevin M. Faulkner

(57) ABSTRACT

A nonwoven fabric made from a composition comprising (a) a propylene-based elastomer characterized by including from about 5% to about 35% by weight units deriving from alpha-olefin and a heat of fusion, as determined by DSC, of less than 80 J/g, (b) a propylene-based thermoplastic polymer characterized by an MFR (ASTM D-1238 2.16 kg @ 230° C.) of from about 3 to about 300 dg/min, and a heat of fusion, as determined by DSC, of greater than 80 J/g, and (c) a feel modifier selected from the group consisting of (i) a high-MFR thermoplastic resin having an MFR (ASTM D-1238 2.16 kg @ 230° C.) in excess of 400 dg/min, (ii) a hydrocarbon resin, (iii) a polyolefin wax, (iv) a functionalized hydrocarbon resin, (v) a functionalized polyolefin, and (vi) a combination of two or more of the foregoing feel modifiers, and (d) optionally a slip aid.

20 Claims, No Drawings

FIBERS AND NON-WOVENS PREPARED WITH PROPYLENE-BASED ELASTOMERS

FIELD OF THE INVENTION

Embodiments of this invention are directed toward fibers and non-wovens prepared from compositions including a propylene-based elastomer and a feel modifier. In one or more embodiments, the non-wovens are characterized by advantageous feel properties, as well as desirable physical and elastomeric properties.

BACKGROUND OF THE INVENTION

Propylene-based elastomers, which may also be referred to as semi-amorphous propylene copolymers or crystallizable propylene-based copolymers, have been employed in the manufacture of fibers and non-woven fabrics. These copolymers are often blended with other polymers in the pursuit of sundry desirable properties.

For example, U.S. Pat. No. 6,342,565 teaches blends of crystallizable propylene-based polymers with predominately crystalline propylene-based polymers. The crystallizable propylene-based polymers are characterized by a melt temperature of less than 105° C. and a heat of fusion of less that 45 J/g. The predominately crystalline propylene-based polymers are characterized by a melt temperature greater than 110° C., a heat of fusion greater than 60 J/g, and a molecular weight of 10,000 to 5,000,000, with a polydispersity between 1.5 and 40. Fibers made from these blends purportedly have decreased flexural modulus and an increased load capacity, as well as low values of set and load decay.

U.S. Publication No. 2005/0107529 teaches fibers prepared from propylene-based elastomers. For example, Example 1 teaches the production of fibers from a melt that contains a 20 MFR propylene-ethylene copolymer containing 15 weight percent ethylene together with a propylene homopolymer. The propylene homopolymer is either a 36 MFR homopolymer or a 400 MFR homopolymer. The fibers are formed by employing a conventional fiber spinning line in partially oriented yarn mode. Similar blends are spun bonded within Example 2. The fibers and non-wovens prepared therefrom can be heat set to provide durable fabrics.

U.S. Publication No. 2005/0106978 teaches fibers and non-wovens prepared from blends that include a crystalline isotactic polypropylene polymer and an α-olefin copolymer, which is a propylene homopolymer or random propylene copolymer in which the propylene stereoregularity is disrupted by comonomer. The copolymer is characterized by a heat of fusion, as determined by DSC, of from 1.0 J/g to 50 J/g. The blend may include additional components such as additives, process aids, tackifying resins, plasticizers, slip aids, fillers, curatives, and the like. The resulting fabrics are elastic and are useful in personal hygiene products such as diapers, in medical fabrics, and in consumer products.

U.S. Publication No. 2006/0172647 teaches fibers and non-wovens prepared from polymeric blends that include a semi-crystalline polymer and a semi-amorphous polymer. The semi-crystalline polymer is characterized by a melting point between 100° C. and 160° C., a melt flow rate from 0.2 to 2,000 dg/min., a 1% Secant Flexural Modulus of from 1,031 to 1,720 MPa, and a heat of fusion greater than 60 J/g. The semi-amorphous polymer includes propylene and 10 to 25% by weight units deriving from α-olefin monomer. The semi-amorphous polymer is characterized by a crystallinity of from about 2.5 to about 35% by weight, a melting point of 105° C. or less, and a heat of fusion of less than 70 J/g. Non-woven articles produced from these blends have a Hand of 40 g or less at a fabric basis weight of 35 gsm.

SUMMARY OF THE INVENTION

One or more embodiments of the present invention provide a nonwoven fabric made from a composition comprising (a) a propylene-based elastomer characterized by including from about 5% to about 35% by weight units deriving from alpha-olefin and a heat of fusion, as determined by DSC, of less than 80 J/g, (b) a propylene-based thermoplastic polymer characterized by an MFR (ASTM D-1238 2.16 kg @ 230° C.) of from about 3 to about 300 dg/min, and a heat of fusion, as determined by DSC, of greater than 80 J/g, and (c) a feel modifier selected from the group consisting of (i) a high-MFR thermoplastic resin having an MFR (ASTM D-1238 2.16 kg @ 230° C.) in excess of 400 dg/min, (ii) a hydrocarbon resin, (iii) a polyolefin wax, (iv) a functionalized hydrocarbon resin, (v) a functionalized polyolefin, and (vi) a combination of two or more of the foregoing feel modifiers, and (d) optionally a slip aid.

DETAILED DESCRIPTION OF ILLUSTRATIVE EMBODIMENTS

According to one or more embodiments of the present invention, fibers and/or non-woven fabrics are prepared from compositions that include a propylene-based elastomer, a propylene-based thermoplastic resin, and a feel modifier. In one or more embodiments, the feel modifier includes (i) a high-MFR thermoplastic polymer, (ii) a hydrocarbon resin, (iii) a polyolefin wax, (iv) a functionalized hydrocarbon resin, (v) a functionalized polyolefin, or (vi) two or more of the foregoing modifiers. In certain embodiments, the compositions may also include a slip aid. In particular embodiments, the fibers and non-woven fabrics are advantageously prepared by employing spunbonding techniques. Fibers and/or non-woven fabrics of one or more embodiments are advantageously characterized by a desirable feel.

Propylene-Based Elastomer

In one or more embodiments, the propylene-based elastomer, which may also be referred to as propylene-based rubbery copolymer or propylene-α-olefin copolymer, includes units (i.e., mer units) derived from propylene, one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based elastomers with reference to ethylene as the α-olefin.

In one or more embodiments, the propylene-based elastomer may include at least 5% by weight, in other embodiments at least 6% by weight, in other embodiments at least 8% by weight, and in other embodiments at least 10% by weight ethylene-derived units; in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, α-olefin derived, and diene-derived units. Stated another way, the propylene-based elastomer may include at least 75% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived, α-olefin derived, and diene derived mer units.

In one or more embodiments, the propylene-based elastomer may include at least 0.5% by weight, in other embodiments at least 1.5% by weight, and in other embodiments at least 3% by weight diene-derived units; in these or other embodiments, the propylene-based elastomer may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based elastomers of one or more embodiments are characterized by having a single melting temperature as determined by differential scanning calorimetry (DSC). The melting point is defined as the temperature of the greatest heat absorption within the range of melting of the sample. The propylene-based elastomer may show secondary melting peaks adjacent to the principal peak, but for purposes herein, these secondary melting peaks are considered together as a single melting point, with the highest of these peaks being considered the melting point ($T_m$) of the propylene-based rubbery copolymer.

In one or more embodiments, the $T_m$ of the propylene-based elastomer (as determined by DSC) is less than 110° C., in other embodiments less than 90° C., in other embodiments less than 80° C., and in other embodiments less than 70° C.; in these or other embodiments, the propylene-based elastomer has a $T_m$ of at least 25° C., in other embodiments at least of 35° C., in other embodiments at least of 40° C., and in other embodiments at least of 45° C.

In one or more embodiments, the propylene-based elastomer may be characterized by a heat of fusion (Hf), as determined by DSC. In one or more embodiments, the propylene-based elastomer may be characterized by a heat of fusion that is at least 0.5 J/g, in other embodiments at least 1.0 J/g, in other embodiments at least 1.5 J/g, in other embodiments at least 3.0 J/g, in other embodiments at least 4.0 J/g, in other embodiments at least 6.0 J/g, and in other embodiments at least 7.0 J/g. In these or other embodiments, the propylene-based elastomer may be characterized by a heat of fusion of less than 80 J/g, in other embodiments less than 70 J/g, in other embodiments less than 60 J/g, in other embodiments less than 50 J/g, in other embodiments less than 40 J/g, in other embodiments less than 45 J/g, and in other embodiments less than 30 J/g.

As used within this specification, DSC procedures for determining $T_m$ and $H_f$ include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a Differential Scanning Calorimeter (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the heat of fusion (Hf) of the polymer. The melting point is recorded as the temperature of the greatest heat absorption with respect to a baseline within the range of melting of the sample.

The propylene-based elastomer can have a triad tacticity of three propylene units, as measured by $^{13}C$ NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the propylene-based elastomer may have a % crystallinity of from 0.5% to 40%, in other embodiments 1% to 30%, and in other embodiments 5% to 25%, determined according to DSC procedures. Crystallinity may be determined by dividing the heat of fusion of a sample by the heat of fusion of a 100% crystalline polymer, which is assumed to be 189 joules/gram for isotactic polypropylene or 350 joules/gram for polyethylene. In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%.

In one or more embodiments, the propylene-based elastomer can have a density of about 0.85 g/cm$^3$ to about 0.92 g/cm$^3$, in other embodiments about 0.87 g/cm$^3$ to 0.90 g/cm$^3$, and in other embodiments from about 0.88 g/cm$^3$ to about 0.89 g/cm$^3$ at room temperature as measured per the ASTM D-792 test method.

In one or more embodiments, the propylene-based elastomer can have an melt index (MI) (ASTM D-1238, 2.16 kg @ 190° C.), of less than or equal to 10 dg/min, in other embodiments ≦6.5 dg/min, in other embodiments ≦6 dg/min, in other embodiments ≦5.5 dg/min, and in other embodiments ≦5 dg/min.

In one or more embodiments, the propylene-based elastomer can have a melt flow rate (MFR), as measured according to the ASTM D-1238, 2.16 kg weight @ 230° C., equal to or greater than 0.3 dg/min, in other embodiments of at least 0.2 dg/min, in other embodiments at least 0.5 dg/min, and in other embodiments at least 1.0 dg/min. In these or other embodiments, the melt flow rate may be equal to or less than 350 dg/min, and in other embodiments less than 100 dg/min. In an embodiment, the propylene-based elastomer has an MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-based elastomer may have a Mooney viscosity [ML (1+4) @ 125° C.], as determined according to ASTM D-1646, of less than 100, in other embodiments less than 75, in other embodiments less than 60, and in other embodiments less than 30.

In one or more embodiments, the propylene-based elastomer can have a weight average molecular weight ($M_w$) of about 5,000 to about 5,000,000 g/mole, in other embodiments a $M_w$ of about 10,000 to about 1,000,000 g/mole, in other embodiments a $M_w$ of about 20,000 to about 500,000 g/mole and in other embodiments a $M_w$ of about 50,000 to about 400,000 g/mole.

In one or more embodiments, the propylene-based elastomer can have a number average molecular weight ($M_n$) of about 2,500 to about 2,500,000 g/mole, in other embodiments a $M_n$ of about 5,000 to about 500,000 g/mole, in other embodiments a $M_n$ of about 10,000 to about 250,000 g/mole, and in other embodiments a $M_n$ of about 25,000 to about 200,000 g/mole.

In one or more embodiments, the propylene-based elastomer can have a Z-average molecular weight ($M_z$) of about 10,000 to about 7,000,000 g/mole, in other embodiments a $M_z$ of about 50,000 to about 1,000,000 g/mole, in other embodiments a $M_z$ of about 80,000 to about 700,000 g/mole, and in other embodiments a $M_z$ of about 100,000 to about 500,000 g/mole.

In one or more embodiments, the molecular weight distribution (MWD=($M_w/M_n$)) of the propylene-based elastomer may be about 1 to about 40, in other embodiments about 1 to about 5, in other embodiments about 1.8 to about 5, and in other embodiments about 1.8 to about 3.

Techniques for determining the molecular weight ($M_n$, $M_w$ and $M_z$) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practices, and references cited therein. For example, molecular weight may be determined by size exclusion chromatography (SEC) by using a Waters 150 gel permeation chromatograph equipped with the differential refractive index detector and calibrated using polystyrene standards.

Propylene-Based Thermoplastic Polymer

Propylene-based thermoplastic resins, which may also be referred to as propylene-based thermoplastic polymers, include those solid, generally high-molecular weight plastic resins that primarily comprise units deriving from the polymerization of propylene. In certain embodiments, at least 75%, in other embodiments at least 90%, in other embodiments at least 95%, and in other embodiments at least 97% of the units of the propylene-based polymer derive from the polymerization of propylene. In particular embodiments, these polymers include homopolymers of propylene.

In certain embodiments, the propylene-based thermoplastic polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or higher α-olefins, described above, or with $C_{10}$-$C_{20}$ diolefins.

In one or more embodiments, propylene-based thermoplastic polymers may include crystalline and semi-crystalline polymers. In one or more embodiments, these polymers may be characterized by a crystallinity of at least 40% by weight, in other embodiments at least 55% by weight, in other embodiments at least 65%, and in other embodiments at least 70% by weight as determined by DSC. In one or more embodiments, these polymers may be characterized by a Hf of at least 80 J/g, in other embodiments in excess of 100 J/g, in other embodiments in excess of 125 J/g, and in other embodiments in excess of 140 J/g.

In one or more embodiments, useful propylene-based thermoplastic polymers may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

In one or more embodiments, useful propylene-based thermoplastic polymers can have a MFR (ASTM D-1238, 2.16 kg @ 230° C.) of about 0.1 to 400 dg/min, in other embodiments from about 0.5 to about 250 dg/min, and in other embodiments from about 1 to about 100 dg/min. In these or other embodiments, the propylene-based thermoplastic polymer may have an MFR of less than 400 dg/min, in other embodiments less than 100 dg/min, in other embodiments less than 50 dg/min, and in other embodiments less than 10 dg/min.

In one or more embodiments, useful propylene-based thermoplastic polymers can have a $T_m$ that is from about 110° C. to about 250° C., in other embodiments from about 155° C. to about 170° C., and in other embodiments from about 160° C. to about 165° C. They may have a glass transition temperature ($T_g$) of from about −10 to about 10° C., in other embodiments from about −3 to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° to 115° C.

The propylene-based thermoplastic polymers may be synthesized by using an appropriate polymerization technique known in the art such as, but not limited to, conventional Ziegler-Natta type polymerizations and catalysis employing single-site organometallic catalysts including, but not limited to, metallocene catalysts.

In one embodiment, the propylene-based thermoplastic polymers include a homopolymer of a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be employed. In one or more embodiments, polypropylene resins may be characterized by a MFR (ASTM D-1238; 2.16 kg @ 230° C.) that is less than or equal to 10 dg/min, in other embodiments less than or equal to 1.0 dg/min, and in other embodiments less than or equal to 0.5 dg/min.

Hydrocarbon Resin

In one or more embodiments, hydrocarbon resins may include natural resins, synthetic resins, and low molecular weight polymers or oligomers. In one or more embodiments, the hydrocarbon resins are solid materials at standard conditions of temperature and pressure. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomer can include $C_8$, $C_9$, and $C_{10}$ aromatic monomer. Examples of aromatic monomer includes styrene, indene, derivatives of styrene, derivatives of indene, and combinations thereof.

In one or more embodiments, types of hydrocarbon resins include petroleum resins, terpene resins, styrene resins, and cyclopentadiene resins. Examples of hydrocarbon resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosins, rosin esters, hydrogenated rosins, hydrogenated rosin esters, and mixtures of two or more thereof.

In one or more embodiments, hydrocarbon resins may be characterized by a $M_n$ of from about 400 to about 5,000 g/mole, in other embodiments from about 500 g/mole to about 3,000 g/mole, in other embodiments from about 600 g/mole to about 2,000 g/mole, and in other embodiments from about 700 g/mole to about 1,000 g/mole. These hydrocarbon resins may also be characterized by a $M_w$ of from about 500 g/mole to about 6,000 g/mole, and in other embodiments from about 700 g/mole to about 5,000 g/mole. Still further, these hydrocarbon resins may be characterized by a $M_z$ of from about 700 g/mole to about 15,000 g/mole, and in other embodiments from about 8,000 g/mole to about 12,000 g/mole.

In certain embodiments, the hydrocarbon resins include those produced by thermal polymerization of dicyclopentadiene (DCPD) or substituted DCPD, which may further include aliphatic or aromatic monomers. In one embodiment, the DCPD or substituted DCPD is copolymerized with aromatic monomer, and the final product includes less than 10% aromatic content. In another embodiment, the hydrocarbon resin derives from the copolymerization of both aliphatic monomer and aromatic monomer.

Synthetic oligomers may include dimers, trimers, tetramers, pentamers, hexamers, septamers, and octamers of petroleum distillate monomer. In one or more embodiments, petroleum distillate monomer may have a boiling point of from about 30° to about 210° C. The oligomers may include byproducts of resin polymerization including thermal and catalytic polymerization. For example, oligomers may derive from processes where DCPD, aliphatic monomer, and/or aromatic monomer are oligomerized and then grafted.

In one or more embodiments, the hydrocarbon resins may include those characterized by an aromatic content of from about 1 to about 60%, in other embodiments from about 2 to about 40%, and in other embodiments from about 5 to about 10%. Also, the hydrocarbon resins may be at least partially hydrogenated. For example, the hydrocarbon resin may contain less than 90, in other embodiments less than 50, in other embodiments less than 25, in other embodiments less than 10, in other embodiments less than 2, in other embodiments less than 1, in other embodiments less than 0.5, and in other embodiments less than 0.05 olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the hydrocarbon resins may be characterized by a softening point of from about 10° C. to about 180° C., in other embodiments from about 110° C. to about 160° C., in other embodiments from about 60° C. to about 130° C., in other embodiments from about 90° C. to about 130° C., in other embodiments from about 80° C. to about 120° C., in other embodiments from about 80° C. to about 150° C., and in other embodiments from about 90° C. to about 110° C., wherein any upper limit and any lower limit of softening point may be combined for a desired softening point range. Softening point (° C.) may be measured as a ring and ball softening point according to ASTM E-28 (Revision 1996). In these or other embodiments, the softening point may be greater than 30° C., in other embodiments greater than 50° C., in other embodiments greater than 75° C., in other embodiments greater than 100° C., and in other embodiments greater than 120° C.

In one or more embodiments, the hydrocarbon resins may be characterized by a glass transition temperature (Tg), as measured by DSC, of from about −40° C. to about 130° C., in other embodiments from about 40° C. to about 80° C., and in other embodiments from about 30° C. to about 70° C., wherein any upper limit and any lower limit of Tg may be combined for a desired Tg range. In these or other embodiments, the Tg of the hydrocarbon resins may be greater than 30° C., in other embodiments greater than 50° C., in other embodiments greater than 60° C., and in other embodiments greater than 70° C.

In one or more embodiments, the hydrocarbon resins may include functionalized hydrocarbon resins. These resins include at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon resin. Useful functionalized hydrocarbon resins include those described in U.S. Patent Publication Nos. 2004/0260021 A1 and 2004/0266947 A1.

Commercially available hydrocarbon resins may be employed in practicing this invention. Exemplary commercially available resins include PA 609™ (ExxonMobil), EMPR 120, 104, 111, 106, 112, 115, EMPR 100 and 100A, 1035 ECR-373 and ESCOREZ® 2101, 2203, 2520, 5380, 5600, 5618, 5690 (commercially available from ExxonMobil Chemical Company of Baytown, Tex., USA); ARKON™ M90, M100, M115 and M135 and SUPER ESTER™ rosin esters (commercially available from Arakawa Chemical Company of Japan); commercially available hydroSYLVARES™ phenol modified styrene, methyl styrene resins, styrenated terpene resins, ZONATAC™ terpene-aromatic resins, and terpene phenolic resins (commercially available from Arizona Chemical Company of Jacksonville, Fla., USA); SYLVATAC™ and SYLVALITE™ rosin esters (commercially available from Arizona Chemical Company of Jacksonville, Fla., USA); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ $C_5/C_9$ resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa., USA); FORAL™, PENTALYN™, and PERMALYN™ rosins and rosin esters (commercially available from Hercules, now Eastman Chemical Company of Kingsport, Tenn., USA); QUINTONE™ acid modified $C_5$ resins, $C_5/C_9$ resins, and acid modified $C_5/C_9$ resins (commercially available from Nippon Zeon of Japan); LX™ mixed aromatic/cycloaliphatic resins (commercially available from Neville Chemical Company of Pittsburgh, Pa., USA); CLEARON™ hydrogenated terpene aromatic resins (commercially available from Yasuhara of Japan); and PICCOLYTE™ (commercially available from Loos & Dilworth, Inc. of Bristol, Pa., USA). Other suitable hydrocarbon resins may be found in U.S. Pat. No. 5,667,902.

High-MFR Thermoplastic Resin

In one or more embodiments, high-MFR thermoplastic resins include those resins having an MFR (ASTM D-1238, 2.16 kg @ 230° C.) of from 400 to 1,800 dg/min, in other embodiments from about 500 to about 1,700 dg/min, and in other embodiments from about 1,000 to about 1,600 dg/min. In these or other embodiments, the high-MFR thermoplastic resins have an MFR of greater than 400 dg/min, in other embodiments greater than 600 dg/min, in other embodiments greater than 800 dg/min, in other embodiments greater than 1,000 dg/min, and in other embodiments greater than 1,200 dg/min.

In these or other embodiments, the high-MFR thermoplastic resins may be characterized by a relatively low molecular weight. In one or more embodiments, high-MFR thermoplastic resins may be characterized by an $M_w$ of from about 29 to about 55 kg/mole, and in other embodiments from about 30 to about 51 kg/mole. They may also be characterized by a $M_n$ of about 8 to about 15 kg/mole, and in other embodiments about 9.5 to about 14.5 kg/mole, as measured by GPC with polystyrene standards. In these or other embodiments, the high-MFR thermoplastic resins may be characterized by an Mn of less than 16 kg/mole, in other embodiments less than 13 kg/mole, and in other embodiments less than 11 kg/mole.

The high-MFR thermoplastic resins may include the polymerization product of a variety of monomers. In one or more embodiments, the high-MFR thermoplastic resins include the polymerization product of one or more α-olefin monomers including ethylene. In these or other embodiments, the high-MFR thermoplastic resins include propylene-based polymers such as those solid plastic resins that primarily comprise units deriving from the polymerization of propylene. In certain embodiments, at least 75%, in other embodiments at least 90%, in other embodiments at least 95%, and in other embodiments at least 97% of the units of the propylene-based polymer derive from the polymerization of propylene. In particular embodiments, these high-MFR thermoplastic resins include homopolymers of propylene.

In certain embodiments, the high-MFR thermoplastic resins may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or higher α-olefins, described above, or with $C_{10}-C_{20}$ diolefins.

In one or more embodiments, useful high-MFR thermoplastic resins can have a $T_m$ that is from about 110° C. to about 250° C., in other embodiments from about 155° C. to about 170° C., and in other embodiments from about 160° C. to about 165° C. They may have a $T_g$ of from about −10 to about 10° C., in other embodiments from about −3 to about 5° C., and in other embodiments from about 0° C. to about 2° C. In one or more embodiments, they may have a $T_c$ of at least about 75° C., in other embodiments at least about 95° C., in other embodiments at least about 100° C., and in other embodiments at least 105° C., with one embodiment ranging from 105° to 115° C.

The high-MFR thermoplastic resins may be synthesized by using an appropriate polymerization technique known in the art such as, but not limited to, conventional Ziegler-Natta type polymerizations and catalysis employing single-site organometallic catalysts including, but not limited to, metallocene catalysts.

Functionalized Polyolefins

In one or more embodiments, the functionalized thermoplastic polyolefins, which may also be referred to as functionalized thermoplastic resins, include at least one functional group. In one or more embodiments, the functional group, which may also be referred to as a functional substituent or functional moiety, includes a hetero atom. In one or more embodiments, the functional group includes a polar group. Examples of polar groups include hydroxy, propoxy, carbonyl, ether, halide, amine, imine, and nitrile groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the polyolefin.

In one or more embodiments, the functionalized polyolefin may be prepared by grafting a graft monomer to a polyolefin. The process of grafting may include combining, contacting, or reacting a polyolefin with a graft monomer. These functionalized polyolefins include those described in U.S. Pat. Nos. 4,957,968, 5624,999, and 6,503,984.

The polyolefins to which a functional group may be grafted can include polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Other polyolefin copolymers may include copolymers of olefins with styrene such as styrene-ethylene copolymer or polymers of olefins with α,β-unsaturated acids, and/or α,β-unsaturated esters such as polyethylene-acrylate copolymers.

These homopolymers and copolymers may be synthesized by using an appropriate polymerization technique known in the art. These techniques may include conventional Ziegler-Natta type polymerizations, catalysis employing single-site organometallic catalysts including, but not limited to, metallocene catalysts, and high-pressure free radical polymerizations.

The polyolefin that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30% as determined by DSC. In these or other embodiments, the polyolefins to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g as determined by DSC.

In one or more embodiments, the thermoplastic polymers, prior to grafting, may be characterized by a $M_w$ of from about 100 kg/mole to about 2,000 kg/mole, and in other embodiments from about 300 kg/mole to about 600 kg/mole. They may also be characterized by a $M_n$ of about 80 kg/mole to about 800 kg/mole, and in other embodiments about 90 kg/mole to about 200 kg/mole. Molecular weight may be determined by size exclusion chromatography (SEC) by using, for example, a Waters 150 gel permeation chromatograph equipped with the differential refractive index detector and calibrated using polystyrene standards.

In one or more embodiments, these thermoplastic polymers, prior to grafting, may be characterized by a MFR (ASTM D-1238 at 230° C. and 2.16 kg load) of from about 0.3 to about 2,000 dg/min, in other embodiments from about 0.5 to about 1,000 dg/min, and in other embodiments from about 1 to about 1,000 dg/min.

In one or more embodiments, these thermoplastic resins, prior to grafting, may have a $T_m$ that is from about 110° C. to about 250° C., in other embodiments from about 120 to about 170° C., and in other embodiments from about 130° C. to about 165° C. In one or more embodiments, they may have a $T_c$ at least about 75° C., in other embodiments at least about 95° C., in other embodiments at least about 100° C., and in other embodiments at least 105° C., with one embodiment ranging from 1050 to 115° C.

The degree of functionalization of the functionalized polyolefin may be recited in terms of the weight percent of the pendent functional moiety based on the total weight of the functionalized polymer. In one or more embodiments, the functionalized polyolefin may include at least 0.2% by weight, in other embodiments at least 0.4% by weight, in other embodiments at least 0.6% by weight, and in other embodiments at least 1.0 weight percent functionalization. In these or other embodiments, the functionalized thermoplastic polymers may include less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by an MFR (ASTM D-1238, 2.16 Kg @230° C.) of from about 20 to about 2,000 dg/min, in other embodiments from about 100 to about 1,500 dg/min, and in other embodiments from about 150 to about 750 dg/min. In one or more embodiments, where the functionalized thermoplastic polymer is a functionalized ethylene-based polymer, it can be characterized by an MI (ASTM D-1238, 2.16 kg & 190° C.) of from about 0.2 to about 2,000 dg/min, in other embodiments from about 1 to about 1,000 dg/min, and in other embodiments from about 5 to about 100 dg/min.

Functionalized thermoplastic polymers are commercially available. For example, maleated propylene-based polymers may be obtained under the tradename FUSABOND™ (DuPont), POLYBOND™ (Crompton), EXXELOR™, EXXELOR™ P01015, EXXELOR™ P01020 (ExxonMobil), or EPOLENE™ (Eastman); also contemplated is the use of silicone grafted polyethylene copolymers such as those available under the tradename LUBOTENE (Optatech).

Polyolefin Waxes

In one or more embodiments, polyolefin waxes include low molecular weight polyolefins. These polyolefins may derive from the polymerization of olefins such as ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof.

In one or more embodiments, these waxes may be characterized by a Brookfield Viscosity at 190° C. of less than 2,000 cP, in other embodiments less than 1,000 cP, and in other embodiments less than 100 cP.

Slip Aids

In one or more embodiments, useful slip aids include those compounds or molecules that are incompatible with the polymeric matrix of the fibers (i.e., the propylene-based elastomers and/or propylene-based thermoplastic resins and/or feel modifiers) and therefore migrate to the surface of the fiber. In one or more embodiments, the slip aids form a monolayer over the surface (or a portion thereof) of the fiber. In these or other embodiments, useful slip aids are characterized by relatively low molecular weight, which can facilitate migration to the surface. Types of slip aids include fatty acid amides as disclosed in *Handbook of Antiblocking, Release and Slip Additives*, George Wypych, Page 23. Examples of fatty acid amides include behenamide, erucamide, N-(2-hdriethyl) erucamide, Lauramide, N,N'-ethylene-bis-oleamide, N,N'-ethylene bissteamide, oleamide, oleyl palmitamide, stearyl erucamide, tallow amide, and mixtures thereof. In some embodiments, one or more slip aids may be added to the blends of the invention as part of a masterbatch. In such embodiments, the slip aid is added in a manner than provides an effective concentration of from about 1,000 to about 10,000 ppm, preferably from about 3,000 to about 6,000 ppm, of the slip aid in the resulting fibers or fabric.

Other Additives

The blends of this invention may also comprise other ingredients. For example the blends of this invention may comprise nucleating agents, which can be present at 50 to 4000 ppm based on total polymer in the blend composition. Nucleating agents include, for example, sodium benzoate and talc. Also, other nucleating agents may also be employed such as Ziegler-Natta olefin products or other highly crystalline polymers. Nucleating agents include Hyperform such as HPN-68 and Millad additives (e.g., Millad 3988) (Milliken Chemicals, Spartanburg, S.C.) and organophosphates like NA-11 and NA-21 (Amfine Chemicals, Allendale, N.J.).

Further, a variety of additives may be incorporated into the embodiments described above used to make the blends, fibers, and fabrics for various purposes. Other additives include, for example, stabilizers, antioxidants, and/or fillers. Primary and secondary antioxidants include, for example, hindered phenols, hindered amines, and phosphites. Other additives such as dispersing agents, for example Acrowax C, can also be included. Catalyst deactivators may also be used including, for example, calcium stearate, hydrotalcite, and calcium oxide, and/or other acid neutralizers known in the art.

Other additives include, for example, fire/flame retardants, plasticizers, vulcanizing or curative agents, vulcanizing or curative accelerators, cure retarders, processing aids, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include antiblocking agents or lubricants.

In yet other embodiments, isoparaffins, polyalphaolefins, polybutenes, or a mixture of two or more thereof may also be added to the compositions of the invention. Polyalphaolefins may include those described in WO 2004/014998, particularly those described at page 17, line 19 to page 19, line 25. These polyalphaolefins may be added in amounts such as about 0.5 to about 40% by weight, in other embodiments from about 1 to about 20% weight, and in other embodiments from about 2 to about 10% by weight.

Amounts

In one or more embodiments, the compositions employed in the manufacture of fibers and non-woven fabrics according to the present invention may include from about 1% to about 99% by weight, in other embodiments from about 10% to about 95% by weight, in other embodiments from about 50% to about 90% by weight, and in other embodiments from about 60% to about 70% by weight of the propylene-based elastomer, based upon the total weight of the composition.

In one or more embodiments, the compositions employed in the manufacture of fibers and fabrics may include from about 1% to about 99% by weight, in other embodiments from about 2% to about 50% by weight, in other embodiments from about 5% to about 20% by weight, and in other embodiments from about 10% to about 13% by weight of the propylene-based thermoplastic resin, based upon the total weight of the composition.

In one or more embodiments, the compositions employed in the manufacture of fibers and fabrics may include from about 0 parts per million (ppm) to about 50,000 ppm, in other embodiments from about 1 ppm to about 40,000 ppm, in other embodiments from about 2 ppm to about 30,000 ppm, and in other embodiments from about 3 ppm to about 7,000 ppm of the slip aid, based upon the total weight of the composition.

In one or more embodiments, the compositions employed in the manufacture of fibers and fabrics may include from about 0.1% to about 50% by weight, in other embodiments from about 0.5% to about 40% by weight, in other embodiments from about 1% to about 30% by weight, and in other embodiments from about 1% to about 10% by weight of the feel modifier, based upon the total weight of the composition.

Where the feel modifier includes a blend of a hydrocarbon resin and a high-MFR thermoplastic resin, the weight ratio of the hydrocarbon resin to the high-MFR thermoplastic resin may be from about 0.2:1 to about 100:1, in other embodiments from about 0.3:1 to about 5:1, in other embodiments from about 0.4:1 to about 3:1, and in other embodiments from about 0.5:1 to about 2:1.

In one or more embodiments, the compositions employed in the manufacture of fibers and fabrics may include from about 0 to about 30 weight percent, in other embodiments from about 1 to about 25 weight percent, in other embodiments from about 2 to about 20 weight percent, and in other embodiments from about 3 to about 10 weight percent of the other additives, based upon the total weight of the compound. These other additives may include those described above.

Preparing the Composition

The compositions employed to make the fibers and/or nonwoven fabrics of one or more embodiments of this invention may be prepared by employing several techniques. In one embodiment, a blend of the propylene-based elastomer and the propylene-based thermoplastic resin (i.e., low MFR resin) may be first prepared, and then the other ingredients (e.g., hydrocarbon and/or high MFR resin) may be added or introduced to the blend. The propylene-based elastomer and propylene-thermoplastic resin may be prepared by any procedure that causes an intimate admixture of the components. For example, they may be blended in a tumbler, static mixer, batch mixer, extruder, or a combination thereof. In these or other embodiments, the mixing may take place as part of a processing method used to fabricate the fibers. In other embodiments, an internal mixer may be employed for melt blending; for example, the components can be blended at 180° C. to 240° C. in a Brabender Plastograph for 1 to 20 minutes. In yet other embodiments, the polymers can be blended in a Banbury internal mixer above the flux temperature of the polymers (e.g., 180° C. for about 5 min.). In yet other embodiments, a continuous mixer may be employed including those well known in the art such as twin-screw mixing extruders, static mixers for mixing molten polymer streams of low viscosity, impingement mixers, and the like. In another embodiment, the propylene-based elastomer and the propylene-based thermoplastic resin can be treated with peroxide in the melt to tailor the viscosity of the polymer to a higher melt flow rate. As is known in the art, this reduction in MFR may be referred to as visbreaking.

In other embodiments, the blend may be formed in situ or by means of sequential polymerization. This may include reactor blends, where the propylene-based thermoplastic resin is polymerized in one reactor (or one stage of one reactor) and the polymerized product is transferred to a different reactor or different stage of the same reactor, where polymerization of the propylene-based elastomer occurs.

In one or more embodiments, the blend of the propylene-based elastomer and propylene-based thermoplastic resin may be a heterogeneous blend where the propylene-based thermoplastic resin is the continuous phase and the propylene-based elastomer is the discontinuous phase. As those skilled in the art appreciate, heterogeneous solid-state blends include those blends of two polymers where one polymer forms discrete packets dispersed (e.g., particles) in a matrix of another polymer. In other embodiments, heterogeneous blends include co-continuous blends where the blend components are separately visible, but it is unclear which is the continuous phase and which is the discontinuous phase.

The addition or introduction of the additional ingredients (e.g., feel modifiers and/or slip aid) to the blend of the propylene-based elastomer and propylene-based thermoplastic resin may take place by using similar methods employed to form the initial blend. In particular embodiments, the additional ingredients are added as part of the fiber forming process. For example, the high MFR resin and/or hydrocarbon resin and/or slip aids may be added to the extruder employed in the fiber making process.

Fiber & Fabric Formation

The formation of nonwoven fabrics from the foregoing compositions may include manufacture of fibers by extrusion followed by weaving or bonding. The extrusion process may be accompanied by mechanical or aerodynamic drawing of the fibers. The fiber and fabrics of the present invention may be manufactured by any technique and/or equipment known in the art, many of which are well known. For example, spunbond nonwoven fabrics may be produced by spunbond nonwoven production lines produced by Reifenhauser GmbH & Co., of Troisdorf, Germany. The Reifenhauser system utilizes a slot drawing technique as described in U.S. Pat. No. 4,820,142.

Conventional Fine Denier Fibers

In one or more embodiments, fibers may be produced by continuous filament, bulked continuous filament, or staple fiber-formation techniques. For example, the polymer melt may be extruded through the holes in the die (spinneret), which may, for example, be between 0.3 mm and 0.8 mm in diameter. Low melt viscosity of the polymer may be achieved through the use of high melt temperature (e.g., 230° C. to 280° C.) and high melt flow rates (e.g., 15 g/10 min to 40 g/10 min) of the polymers used. A relatively large extruder may be equipped with a manifold to distribute a high output of molten polymer to a bank of from about eight to about twenty spinnerets. Each spinhead may be equipped with: a separate gear pump to regulate output through that spinhead; a filter pack, supported by a "breaker plate;" and the spinneret plate within the head. The number of holes in the spinneret plate determines the number of filaments in a yarn and varies considerably with the different yarn constructions, but it is typically in the range of 50 to 250. The holes can be grouped into round, annular, or rectangular patterns to assist in good distribution of the quench air flow.

Continuous Filament

Continuous filament (CF) yarns can range from 40 denier to 2,000 denier (denier=number of grams/9000 yd). Filaments can range from 1 to 20 denier per filament (dpf), although larger ranges are contemplated. Spinning speeds may vary from 800 m/min to 1500 m/min (2500 ft/min to 5000 ft/min). An exemplary method would proceed as follows. The filaments are drawn at draw ratios of 3:1 or more (one- or two-stage draw) and wound onto a package. Two-stage drawing allows higher draw ratios to be achieved. Winding speeds are 2,000 m/min to 3,500 m/min (6,600 ft/min to 11,500 ft/min). Spinning speeds in excess of 900 m/min (3000 ft/min) may require resins with a narrow molecular weight distribution to get the best spinnability with finer filaments, such as resins with a minimum MFR of 5 and a narrow molecular weight distribution, such as under 2.8 dg/min for example. In slower spinning processes, or in heavier denier filaments, a 16-MFR reactor grade product may be more appropriate.

Partially Oriented Yarn (POY)

Partially oriented yarn (POY) is the fiber produced directly from fiber spinning without solid state drawing (as continuous filament mentioned above). The orientation of the molecules in the fiber is done in the melt state just after the molten polymer leaves the spinneret. Once the fiber is solidified, no drawing of the fiber takes place and the fiber is wounded up into a package. The POY yarn (as opposed to fully oriented yarn, or FOY, which has gone through solid state orientation and has a higher tensile strength and lower elongation) tends to have a higher elongation and lower tenacity.

Bulked Continuous Filament

Bulked continuous filament fabrication processes fall into two basic types, one-step and two-step. For example, in a two-step process, an undrawn yarn is spun at less than 1,000 m/min (3,300 ft/min), usually about 750 m/min, and placed on a package. The yarn is drawn (usually in two stages) and "bulked" on a machine called a texturizer. Winding and drawing speeds are limited by the bulking or texturizing device, generally to 2,500 m/min (8,200 ft/min) or less. As in the two-step CF process, secondary crystallization requires prompt draw texturizing. Common bulked continuous filament processes include one-step spin/draw/text (SDT) processes. This process may provide better economics, efficiency and quality than the two-step process. They are similar to the one-step CF process, except that the bulking device is in-line. Bulk or texture may change yarn appearance, separating filaments and adding enough gentle bends and folds to make the yarn appear fatter (bulkier).

Staple Fiber

Fiber fabrication processes include two processes: traditional and compact spinning. The traditional process typically involves two steps: i) producing, applying finish, and winding followed by ii) drawing, a secondary finish application, crimping, and cutting into staple. During the traditional spinning process, a 'triangle' is created as fibers are drawn out of an apparatus. Compact spinning minimizes or eliminates the triangle, and may reduce the amount of stray fibers and weak spots in a thread. It is called 'compact' because outside fibers are compacted towards the core of the yarn as they are twisted.

Filaments can range, for example, from 1.5 dpf to >70 dpf, depending on the application. Staple length can be as short as 7 mm or as long as 200 mm (0.25 in. to 8 in.) to suit the application. For many applications, the fibers are crimped. Crimping is accomplished by over-feeding the tow into a steam-heated stuffer box with a pair of nip rolls. The overfeed folds the tow in the box, forming bends or crimps in the filaments. These bends may be heat-set by steam injected into the box. The MW, MWD, and isotactic content of the resin can affect crimp stability, amplitude, and ease of crimping.

Melt Blown Fabrics

Melt blown fabrics may refer to webs of fine filaments having fiber diameter in the range of 20 to 0.1 microns. In some embodiments, fiber diameters of melt blown fibers may be in the range of 1 to 10 microns, or in other embodiments from 1 to about 5 microns. The nonwoven webs formed by these fine fiber diameters have very small pore sizes and therefore may have excellent barrier properties. For example, in a melt blown process, an extruder melts the polymer and delivers it to a metering melt pump. The melt pump delivers the molten polymer at a steady output rate to a special melt blowing die. As the molten polymer exits the die, it is contacted by high temperature, high velocity air (called process or primary air). This air rapidly draws and, in combination with the quench air, solidifies the filaments. The entire fiber forming process typically takes place within several inches of the die. Die design can be important to producing a quality product efficiently. The fabric is formed by blowing the filaments directly onto a porous forming belt, typically 200 mm to 400 mm (8 in. to 15 in.) from the spinnerets. A larger forming distance may be used for heavier basis weight, higher loft product. Melt blowing may require very high melt flow rate resins such as those greater than 200 g/10 min, to obtain the finest possible fibers, although resin MFR as low as 20 g/10 min can be used at a higher processing temperature in other embodiments.

Spunbonded Fabric

Spunbond or spunbonded fibers include fibers produced, for example, by the extrusion of molten polymer from either a large spinneret having several thousand holes or with banks of smaller spinnerets, for example, containing as few as 40 holes. After exiting the spinneret, the molten fibers are quenched by a cross-flow air quench system, then pulled away from the spinneret and attenuated (drawn) by high speed air. There are generally two methods of air attenuation, both of which use the venturi effect. The first draws the filament using an aspirator slot (slot draw), which may run the width of the spinneret or the width of the machine. The second method draws the filaments through a nozzle or aspirator gun. Filaments formed in this manner may be collected on a screen ("wire") or porous forming belt to form the web. The web can then be passed through compression rolls and then between heated calendar rolls where the raised lands on one roll bond the web at points covering, for example, 10% to 40% of its area to form a nonwoven fabric. In another embodiment, welding of the fibers can also be effected using convection or radiative heat. In yet another embodiment, fiber welding can be effected through friction by using hydro entangling or needle punch methods.

Annealing may be done after the formation of fiber in continuous filament or fabrication of a non-woven material from the fibers. Annealing may partially relieve the internal stress in the stretched fiber and restore the elastic recovery properties of the blend in the fiber. Annealing has been shown to lead to significant changes in the internal organization of the crystalline structure and the relative ordering of the amorphous and semicrystalline phases. This may lead to recovery of the elastic properties. For example, annealing the fiber at a temperature of at least 40° C. above room temperature (but slightly below the crystalline melting point of the blend), may be adequate for the restoration of the elastic properties in the fiber.

Thermal annealing of the fibers can be conducted by maintaining the fibers (or fabrics made from the fibers) at temperatures, for example, between room temperature up to 160° C., or alternatively to a maximum of 130° C. for a period from between a few seconds to less than 1 hour. A typical annealing period is 1 to 5 minutes at 100° C. The annealing time and temperature can be adjusted based upon the composition employed. In other embodiments, the annealing temperature ranges from 60° C. to 130° C. In another embodiment, the temperature is about 100° C.

In certain embodiments, for example conventional continuous fiber spinning, annealing can be done by passing the fiber through a heated roll (godet), without the application of conventional annealing techniques. Annealing may desirably be accomplished under very low fiber tension to allow shrinking of the fiber in order to impart elasticity to the fiber. In nonwoven processes, the web usually passes through a calender to point bond (consolidate) the web. The passage of the unconsolidated nonwoven web through a heated calender at relatively high temperature may be sufficient to anneal the fiber and increase the elasticity of the nonwoven web. Similar to fiber annealing, the nonwoven web may desirably be accomplished under low tension to allow for shrinkage of the web in both machine direction (MD) and cross direction (CD) to enhance the elasticity of the nonwoven web. In other embodiments, the bonding calender roll temperature ranges from 100° C. to 130° C. In another embodiment, the temperature is about 100° C. The annealing temperature can be adjusted for any particular blend.

INDUSTRIAL APPLICABILITY

The fibers and non-woven fabrics of the present invention can be employed in several applications. In one or more embodiments, they may be advantageously employed in diapers and/or similar personal hygiene articles. In particular, they can be employed as the dynamic or stretchable components of these articles such as, but not limited to, the elastic fastening bands. In one or more embodiments, the fabrics of this invention can be employed without the use of additional components, such as boundary layers, that may be used in conventional applications where desirable feel is sought.

In other embodiments, the fibers and fabrics of the present of the present invention can be employed in the manufacture of filter media. For example, particular applications include use in functionalized resins where the non-woven fabric can be electrostatically charged to form an electret.

In order to demonstrate the practice of the present invention, the following examples have been prepared and tested. The examples should not, however, be viewed as limiting the scope of the invention. The claims will serve to define the invention.

EXAMPLES

Example I

A propylene-based elastomer comprising 15 wt % ethylene (MFR: 20 dg/min, density: 0.863 g/cm$^3$) and a polypropylene homopolymer resin were melt blended and, while in the melt, treated with peroxide to adjust the MFR of the blend to about 80. Blend I comprised 85 wt % propylene-based elastomer and 15 wt % polypropylene resin. Blend II comprised 90 wt % propylene-based elastomer and 10 wt % polypropylene resin. Spunbond fabrics were produced from the blends by using a Reicofil™ 1.5 spunbond beam line (Reifenhauser GmbH, Troisdorf, Germany).

The spin beam had approximately a 1 meter wide rectangular spinneret having approximately 4000 holes. Each hole had a diameter of 0.6 mm. The spunbond system included an extruder that delivered homogenized molten polymer to a melt pump, which delivered the molten polymer to the spin beam.

Several different compositions were prepared and spun by introducing slip aid and/or high MFR polypropylene and/or hydrocarbon resin to the blend of polypropylene-based elastomer and polypropylene. These additional ingredients were introduced to the blend via a side feeder on the extruder of the spun bond system. The extruder temperature profile was adjusted to provide a melt temperature of 209° C. The output rate was generally in the range from about 0.2 to about 0.3 gram/hole/min (ghm), which was adjusted for the desired fiber size as set forth in Table I. The amount and type of additional ingredients added to the blend is set forth in Table I.

The molten polymer thread exiting the spinneret was quenched and drawn down into fine fibers by cold air. The draw force is represented by the quench blower r.p.m. The maximum r.p.m. of the quench blower is set forth in Table I, together with the basis weight of the fiber represented in grams per square meter (gsm). The basis weight was maintained at 50 gsm, and for compositions containing the hydrocarbon resin, the quench blower rpm was lowered to optimize spinning conditions and eliminate fiber drips. Basis weight was determined according to ASTM D6242-98.

The quenched and highly drawn fibers were deposited on a moving porous web to form a mat of non-woven web. The unbonded web was passed through a calender roll heated to approximately 88° C. As the web was passed through the nip of the calender, the fiber was annealed (i.e., thermally bonded). The calendar roll pressure was maintained at less than 50 dN/m.

The fabrics were tested for tensile and elastic properties using a United six-station tensile tester with specimens 25.4 mm in width. Tensile tests were conducted by stretching five fabric samples simultaneously at a cross head speed of 127 mm per minute until failure of all specimens. Each composition was tested both in the machine direction (MD) and the cross direction (CD). The average values from testing of multiple specimens were used in the analysis and representation of test data. Various attributes used to define the parameters are as follows:

Tensile, measured in g/cm, corresponds to the maximum load normalized to the sample width;

Elongation, measured as a percentage, corresponds to the elongation at maximum load;

Permanent set, measured as a percentage, is the strain level corresponding to zero force upon return, upon stretching a non-woven fabric sample to 100% extension.

Load loss, measured as a percentage, corresponds to (load on ascending curve−load on descending curve)/load on ascending curve. Load loss is calculated at the 50% strain level.

Mechanical hysteresis, measured as a percentage, corresponds to the area enclosed by the ascending and descending portion of the load displacement curve.

Pre-stretch measurements are taken during a second cycle, or after the sample has already been stretched once to 100% strain.

TABLE I

|  | Sample | | | | | | |
|---|---|---|---|---|---|---|---|
|  | C1 | C2 | 1 | 2 | 3 | 4 | 5 |
| Ingredients (% by weight) | | | | | | | |
| Blend I | 98 | — | 90 | 72 | 72 | — | — |
| Blend II | — | 98 | — | — | — | 72 | 90 |
| High MFR PP | — | — | 5 | 18 | 18 | 18 | — |
| Hydrocarbon Resin | — | — | 5 | 10 | 10 | 10 | 10 |
| Slip Aid | 2 | 2 | — | — | — | — | — |
| Fiber Production Parameters | | | | | | | |
| Basis Weight (gsm) | 56 | 55 | 57 | 59 | 58 | 48 | 48 |
| Output (ghm) | 0.2 | 0.2 | 0.3 | 0.2 | 0.2 | 0.3 | 0.3 |
| Quench Blower(rpm) | 2352 | 2216 | 2512 | 2683 | 1997 | 2020 | 2408 |
| Fiber Tensile Properties | | | | | | | |
| Diameter (microns) | 20 | 20 | 18 | 15 | 16 | 21 | 21 |
| Machine Direction Tensile | | | | | | | |
| Peak Load (gm/cm) | 855 | 422 | 814 | 2144 | 1331 | 259 | 292 |
| Elongation (%) | 127 | 158 | 145 | 124 | 132 | 149 | 174 |
| Cross Direction Tensile | | | | | | | |
| Peak Load (lb) | 489 | 258 | 576 | 1326 | 1042 | 200 | 227 |
| Elongation (%) | 180 | 257 | 176 | 135 | 146 | 168 | 235 |
| Fiber Elastic Properties | | | | | | | |
| Machine Direction | | | | | | | |
| Permanent Set (%) | 22 | 21 | 39 | 53 | 51 | 25 | 26 |
| Permanent Set Pre-Stretch (%) | 23 | 19 | 33 | 51 | 47 | 23 | 25 |
| Load Loss (%) | 93 | 86 | 98 | 100 | 99 | 94 | 94 |
| Load Loss Pre-Stretch (%) | 85 | 73 | 94 | 98 | 98 | 83 | 83 |
| Mechanical Hysteresis (%) | 77 | 71 | 81 | 82 | 82 | 76 | 77 |
| Mechanical Hysteresis Pre-Stretch (%) | 67 | 58 | 71 | 75 | 77 | 60 | 63 |
| Cross Direction | | | | | | | |
| Permanent Set (%) | 23 | 16 | 42 | 53 | 54 | 25 | 24 |
| Permanent Set Pre-Stretch (%) | 21 | 14 | 32 | 48 | 51 | 20 | 24 |
| Load Loss (%) | 91 | 80 | 98 | 99 | 99 | 92 | 92 |
| Load Loss Pre-Stretch (%) | 82 | 65 | 95 | 99 | 98 | 78 | 80 |
| Mechanical Hysteresis (%) | 75 | 64 | 80 | 82 | 81 | 73 | 74 |
| Mechanical Hysteresis Pre-Stretch (%) | 65 | 52 | 72 | 76 | 77 | 58 | 61 |
| Fabric Feel | Silky and Slightly rubbery | Silky and Slightly rubbery | Satin, Silky | More cloth-like | Cloth-like | Cloth-like | Cloth-like |

The data in Table I shows that the addition of hydrocarbon resin modifies the feel of the control fabric (C1 or C2) from rubbery to drier touch that can be further tuned to a silky, dry touch depending on the additives (Examples 1 through 5). It is noted, however, that touch is a very subjective test and there is no standard method of characterizing this parameter.

Example II

Similar techniques and materials as provided in Example I were employed to prepare additional fibers and fabrics except that the fibers were calendered at 74° C. Table II provides the ingredients that were employed, the fiber production parameters, and the physical properties of the fibers.

TABLE II

| | Sample | | | |
|---|---|---|---|---|
| | C3 | C4 | 6 | 7 |
| Ingredients (% by weight) | | | | |
| Blend I | 98 | — | 88 | — |
| Blend II | — | 97 | — | 88 |
| Hydrocarbon Resin | — | — | 10 | 10 |
| Slip Aid | 2 | 3 | 2 | 2 |
| Fiber Production Parameters | | | | |
| Basis Weight (gsm) | 60 | 61 | 59 | 62 |
| Output (ghm) | 0.2 | 0.3 | 0.3 | 0.3 |
| Quench Blower(rpm) | 2511 | 2540 | 2407 | 2502 |
| Fiber Tensile Properties | | | | |
| Machine Direction Tensile | | | | |
| Peak Load (gm/cm) | 1016 | 628 | 693 | 777 |
| Elongation (%) | 194 | 236 | 218 | 199 |
| Cross Direction Tensile | | | | |
| Peak Load (lb) | 519 | 279 | 490 | 478 |
| Elongation (%) | 232 | 270 | 225 | 227 |
| Fiber Elastic Properties | | | | |
| Machine Direction | | | | |
| Permanent Set (%) | 31 | 21 | 44 | 34 |
| Set Pre-Stretch (%) | 30 | 17 | 41 | 33 |
| Load Loss (%) | 90 | 85 | 98 | 97 |
| Mechanical Hysteresis (%) | 74 | 80 | 86 | 88 |
| Mechanical Hysteresis Pre-Stretch (%) | 74 | 72 | 79 | 70 |
| Cross Direction | | | | |
| Permanent Set (%) | 31 | 16 | 47 | 34 |
| Set Pre-Stretch (%) | 27 | 14 | 40 | 34 |
| Load Loss (%) | 94 | 83 | 98 | 96 |
| Mechanical Hysteresis (%) | 88 | 71 | 86 | 86 |
| Mechanical Hysteresis Pre-Stretch (%) | 82 | 67 | 83 | 80 |
| Fabric Feel | Satin & Rubbery | Satin & Rubbery | Satin & Dry | Satin & Dry |

The data in Table II shows that the addition of hydrocarbon resin feel modifiers provides a drier touch and enhances elongation in the machine direction (Examples C3 vs. 6).

Additional embodiments of the present invention are presented in the following sub-paragraphs:

A. A nonwoven fabric made from a composition comprising:
  (a) a propylene-based elastomer comprising from about 5% to about 35% by weight units deriving from alpha-olefin and having a heat of fusion, as determined by DSC, of less than 80 J/g;
  (b) a propylene-based thermoplastic polymer characterized by an MFR (ASTM D-1238 2.16 kg @ 230° C.) of from about 3 to about 300 dg/min, and a heat of fusion, as determined by DSC, of greater than 80 J/g; and
  (c) a feel modifier selected from the group consisting of
    (i) a high-MFR thermoplastic resin having an MFR (ASTM D-1238 2.16 kg @ 230° C.) in excess of 400 dg/min,
    (ii) a hydrocarbon resin,
    (iii) a polyolefin wax;
    (iv) a functionalized hydrocarbon resin;
    (v) a functionalized polyolefin; and
    (vi) a combination of two or more of the foregoing feel modifiers; and
  (d) optionally a slip aid.
B. The nonwoven fabric of paragraph A, where the propylene-based elastomer is further characterized by a crystallinity of less than 40%.
C. The nonwoven fabric of paragraph A or B, where the propylene-based elastomer is further characterized by a melt temperature of less than 110° C.
D. The nonwoven fabric of any of paragraphs A through C, where propylene-based thermoplastic polymer is further characterized by an MFR of from about 5 to about 100 dg/min.
E. The nonwoven fabric of any of paragraphs A through D, where the feel modifier is a hydrocarbon resin.
F. The nonwoven fabric of paragraph E, where the hydrocarbon resin is characterized by a softening point of from about 110° C. to about 180° C.
G. The nonwoven fabric of paragraph E or F, where the hydrocarbon resin is characterized by a softening point of from about 60° C. to about 130° C.
H. The nonwoven fabric of any of paragraphs E through G, where the hydrocarbon resin is characterized by a glass transition temperature of greater than 30° C. (ASTM D 341-88).
I. The nonwoven fabric of any of paragraphs E through H, where the hydrocarbon resin is characterized by a glass transition temperature of greater than 50° C. (ASTM D 341-88).
J. The nonwoven fabric of any of paragraphs A through I, where the feel modifier is a high-MFR thermoplastic resin.
K. The nonwoven fabric of paragraph J, where the high-MFR thermoplastic resin has an MFR of at least 600 dg/min.
L. The nonwoven fabric of paragraph J or K, where the high-MFR thermoplastic resin has an MFR of at least 1,000 dg/min.
M. The nonwoven fabric of any of paragraphs A through L, where the feel modifier is a functionalized hydrocarbon resin.
N. The nonwoven fabric of any of paragraphs A through L, where the feel modifier is a functionalized polyolefin.
O. The nonwoven fabric of any of paragraphs A through L, where the feel modifier is a polyolefin wax.
P. The nonwoven fabric of any of paragraphs A through O, where the composition includes a slip aid.
Q. The nonwoven fabric of any of paragraphs A through P, where the composition comprises from about 1 to about 99 percent by weight of said propylene-based elastomer, from about 99 to about 1 percent by weight of said propylene-based thermoplastic polymer, from about 0 to about 50,000 ppm of said slip aid, and from about 0.1% to about 50% by weight of said feel modifier, based upon the total weight of the composition.
R. The nonwoven fabric of any of paragraphs A through Q, where the composition further includes an isoparaffin, a polyalphaolefin, a polybutene, or a mixture of two or more thereof.

Various modifications and alterations that do not depart from the scope and spirit of this invention will become apparent to those skilled in the art. This invention is not to be duly limited to the illustrative embodiments set forth herein.

What is claimed is:

1. A nonwoven fabric made from a composition comprising:
   (a) from about 80 to about 95 percent by weight, based upon the entire weight of the composition, of a propylene-based elastomer comprising from about 5% to about 35% by weight units deriving from alpha-olefin and having a heat of fusion, as determined by DSC, of less than 80 J/g;
   (b) from about 5 to about 20 percent by weight, based upon the entire weight of the composition, of a propylene-based thermoplastic polymer characterized by an MFR (ASTM D-1238 2.16 kg @ 230° C.) of from about 3 to about 300 dg/min, and a heat of fusion, as determined by DSC, of greater than 80 J/g, wherein the propylene-based elastomer and propylene-based thermoplastic meltblend is visbroken to adjust the melt flow rate to about 80 dg/min;
   (c) from about 1 to about 10 percent by weight, based upon the entire weight of the composition, of one or more hydrocarbon resin feel modifiers, where the hydrocarbon resin is an olefin, conjugated diolefin, or aromatic resin or a mixture of two or more thereof;
   (d) from about 1 to about 40,000 ppm, based upon the entire weight of the composition, of a slip aid; and
   (e) from about 1 to about 30 percent by weight, based upon the entire weight of the composition, of a high-MFR thermoplastic resin having an MFR (ASTM D-1238 2.16 kg @ 230° C.) in excess of 400 dg/min.

2. The nonwoven fabric of claim 1, where the propylene-based elastomer is further characterized by a crystallinity of less than 40%.

3. The nonwoven fabric of claim 1, where the propylene-based elastomer is further characterized by a melt temperature of less than 110° C.

4. The nonwoven fabric of claim 1, where the propylene-based thermoplastic polymer is further characterized by an MFR of from about 5 to about 100 dg/min.

5. The nonwoven fabric of claim 1, where the hydrocarbon resin is characterized by a softening point of from about 10° C. to about 180° C.

6. The nonwoven fabric of claim 1, where the hydrocarbon resin is characterized by a softening point of from about 60° C. to about 130° C.

7. The nonwoven fabric of claim 1, where the hydrocarbon resin is characterized by a glass transition temperature of greater than 30° C. (ASTM D 341-88).

8. The nonwoven fabric of claim 1, where the hydrocarbon resin is characterized by a glass transition temperature of greater than 50° C. (ASTM D 341-88).

9. The nonwoven fabric of claim 1, where an additional feel modifier is a high-MFR thermoplastic resin.

10. The nonwoven fabric of claim 9, where the high-MFR thermoplastic resin has an MFR of at least 600 dg/min.

11. The nonwoven fabric of claim 9, where the high-MFR thermoplastic resin has an MFR of at least 1,000 dg/min.

12. The nonwoven fabric of claim 1, where the hydrocarbon resin is functionalized.

13. The nonwoven fabric of claim 1, where an additional feel modifier is a functionalized polyolefin.

14. The nonwoven fabric of claim 1, where an additional feel modifier is a polyolefin wax.

15. The nonwoven fabric of claim 1, where the composition further includes an isoparaffin, a polyalphaolefin, a polybutene, or a mixture of two or more thereof.

16. The nonwoven fabric of claim 13, where the composition comprises, from about 2 to about 30,000 ppm of said slip aid, and from about 0.5% to about 40% by weight of said additional feel modifier, based upon the total weight of the composition.

17. The nonwoven fabric of claim 13, where the composition comprises, from about 3 to about 7,000 ppm of said slip aid, and from about 1% to about 10% by weight of said additional feel modifier, based upon the total weight of the composition.

18. The nonwoven fabric of claim 1, where the high-MFR thermoplastic resin and the weight ratio of the hydrocarbon resin to the high-MFR thermoplastic resin is from about 0.2:1 to about 100:1.

19. The nonwoven fabric of claim 1, where the high-MFR thermoplastic resin and the weight ratio of the hydrocarbon resin to the high-MFR thermoplastic resin is from about 0.4:1 to about 3:1.

20. The nonwoven fabric of claim 1, wherein the hydrocarbon resin is formed from one or more monomers selected from the group consisting of butadiene, isobutylene, 1,3-pentadiene, 1,4-pentadiene, 1-pentene, 2-pentene, 2-methyl-1-pentene, 2-methyl-2-butene, 2-methyl-2-pentene, isoprene, 1,3-hexadiene, 1,4-hexadiene, cyclopentadiene, dicyclopentadiene, styrene, indene, and derivatives or combinations thereof.

* * * * *